Oct. 6, 1964     J. H. RAMSEY     3,151,355
SPLICE BOX
Filed Jan. 14, 1963     2 Sheets-Sheet 1
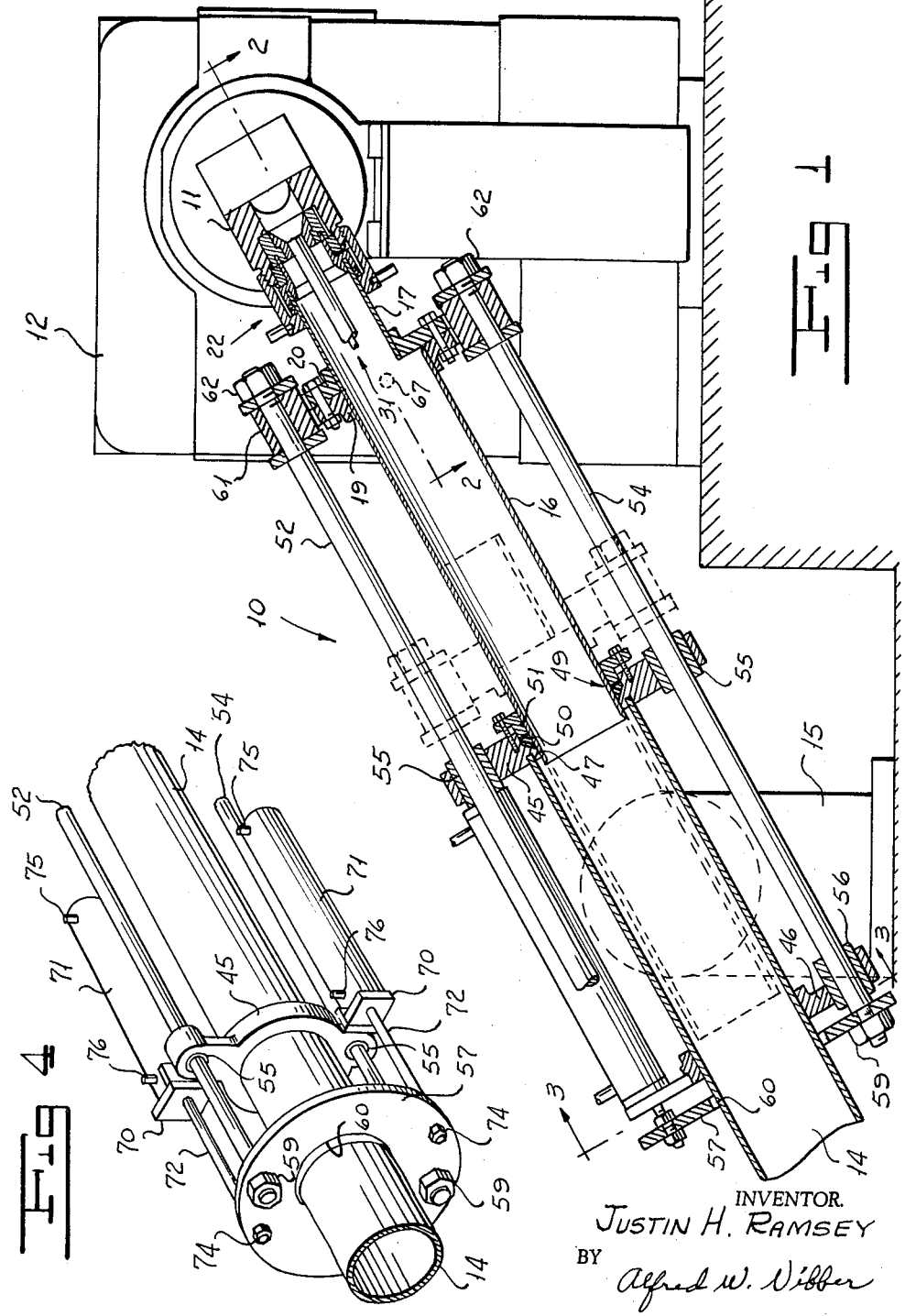
INVENTOR.
JUSTIN H. RAMSEY
BY
Alfred W. Nibber
ATTORNEY

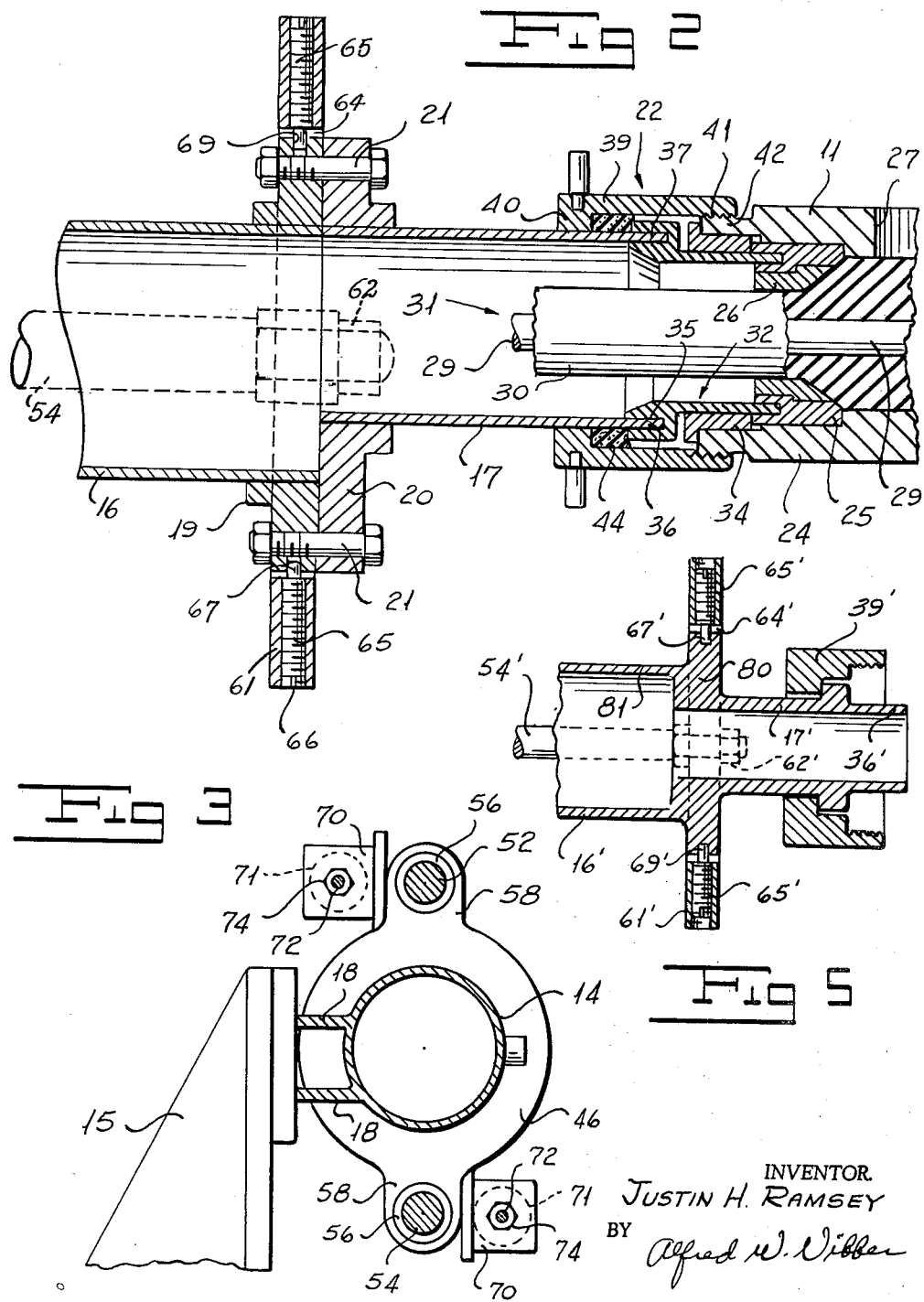

United States Patent Office 3,151,355
Patented Oct. 6, 1964

3,151,355
SPLICE BOX
Justin H. Ramsey, R.F.D 1, Ramsey, N.J.
Filed Jan. 14, 1963, Ser. No. 256,795
8 Claims. (Cl. 18—6)

This invention relates to a retractable conduit section adapted for use in an elongated conduit subjected to fluid under pressure. The illustrative embodiment of the apparatus is particularly adapted for use as a splice box in a continuous vulcanizing system.

In a continuous vulcanizing system elongated vulcanizable material travels through an elongated vulcanizing chamber, usually entering the chamber through an extrusion head which forms an entrance seal for the vulcanizing chamber. The continuous vulcanizing system, particularly if it is for the sheathing of a core such as a wire or cable, usually includes an openable section or splice box which is disposed close to the exit end of the extrusion head and at the entering end of the vulcanizing chamber. In such core sheathing systems, the core or material to be sheathed enters the extrusion head, has a vulcanizable sheath applied thereto by the head, and the thus sheathed core is discharged immediately into the entering end of the vulcanizing chamber. It is necessary in such systems to provide a means of opening the entering end of the vulcanizing chamber immediately beyond the extrusion head, as for permitting the trailing end of a length of sheathed core material to be spliced to the entering end of a new length of core to be sheathed. In order to provide adequate space wherein the operator may make such splice, it is necessary to open a substantial length of the vulcanizing chamber. This has been done by providing one section of the conduit which is mounted slidably with respect to another, sealing means being provided between the movable conduit section and the fixed section of the conduit cooperating therewith and with the other fixed portion of the chamber, usually the exit end of the extrusion head.

The described prior splice boxes tend to present difficulties in the guiding of the movable conduit section and in the establishment of a satisfactory seal between the movable conduit section and the fixed conduit section with which it cooperates. Such difficulties arise primarily by reason of differential expansion of parts of the conduit sections, particularly after the system has been subjected to steam under pressure. Under such condition, when the splice box is disposed horizontal or at an appreciable angle with respect to the vertical, the upper wall portions of the conduit sections forming the splice box are heated to an appreciably higher temperature than are the lower walls of such sections, because the lower wall portions are cooled by the condensate from the steam. Thus the conduit sections of the vulcanizing chamber, including the sections thereof at the splice box, tend to bow in an upwardly convex manner. The movable conduit section of the splice box may also bow as a result of unrelieved strains in its structure. Bowing of the section for this reason may occur when the splice box is mounted vertically, and thus at least in theory is subjected to uniform temperature conditions throughout its peripheral extent. Bowing of the movable conduit section for the latter reason may also occur, of course, when the splice box is mounted horizontally or at a marked angle with respect to the vertical.

The described bowing of the movable conduit section of the splice box, regardless of its cause, introduces a number of operating difficulties into the use of conventional splice boxes. If the bowing takes place when the movable conduit section is operatively coupled to its mating conduit section such as a part of the extrusion head, as by being telescoped therewithin, it becomes difficult to withdraw the movable conduit section from the mating conduit section to open the splice box. If the bowing of the movable conduit section persists, after it has been retracted, it is difficult to introduce the forward end of the movable conduit section within the mating conduit section, because of the misalignment of the parts caused by the bowing of the movable conduit section.

The splice box of the present invention overcomes such difficulties in a simple, economical manner. The splice box of the present invention provides guide means for the movable conduit section of such construction as to permit the forward end of the movable conduit section to have appreciable freedom of turning about an axis parallel to its axis of bowing. A single narrow annular sealing means is employed between the other or rear end of the movable conduit section and the confronting fixed conduit section. The described conduit mounting and sealing means permits the movable conduit section to bow freely as dictated by its bowing as caused, for example, by differential expansion, while still remaining securely sealed to the extrusion head and to the fixed section of the conduit. Such means also permits the movable conduit section to be advanced and retracted without imposing any undue stress upon the mounting and sealing means for the movable section of the conduit.

Although the apparatus of the invention is shown and described herein in connection with its use as a splice box in a continuous vulcanizing system, it is obvious that such apparatus within the broader aspects of the invention is capable of use to advantage in various other applications. Thus the apparatus of the invention may be used to advantage wherever it is necessary to open a conduit which is subjected to fluid under pressure when operatively connected; the apparatus is particularly advantageous in those applications wherein the parts of the conduit are subjected to differential expansion and wherein the retractable conduit section is disposed at a marked angle with respect to the horizontal.

The splice box illustrated herein is generally shown and described in the application of Ramsey and Van Riper, Serial No. 241,671, filed December 3, 1962. In such use of the splice box it is disposed at the entering end of a half-catenary, and is thus disposed at an acute angle with respect to the horizontal. The movable conduit section of the splice box is thus subjected to bowing as a result of differential expansion of its upper and lower wall portions.

The invention has among its objects the provision of a novel retractable conduit section adapted for use in an elongated conduit subjected to a fluid under pressure.

A further object of the invention lies in the provision of a novel splice box for continuous vulcanizing systems.

Yet another object is the provision of a splice box having telescoped relatively movable parts, the guiding of one part relative to another being such as to minimize the stresses therebetween which occur as a result of differential expansion of the parts.

A still further object of the invention resides in the provision, in a splice box of the character indicated, of novel power means for selectively opening and closing the splice box.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in vertical axial section through the upper end of a continuous vulcanizing system wherein the entering end of the vulcanizing chamber is substantially in the form of a half-catenary, the view including a plastic material extrusion machine of which a portion of the head is also shown in section, certain of the parts being shown in elevation;

FIG. 2 is an enlarged fragmentary section through the apparatus of FIG. 1, the section being taken along the line 2—2 of FIG. 1 and at right angles to the section of FIG. 1;

FIG. 3 is a view in transverse section through the vulcanizing chamber adjacent the lower end of the splice box, the section being taken along the line 3—3 of FIG. 1;

FIG. 4 is a fragmentary view in perspective of the illustrative splice box looking from the bottom end of the splice box toward the top thereof; and FIG. 5 is a fragmentary view in axial section of the upper end portion of a second illustrative embodiment of splice box in accordance with the invention, the section of FIG. 5 being taken in generally the same manner as the section of FIG. 2.

Turning now to the drawings, the illustrative splice box in accordance with the invention is designated generally by the reference character 10. Splice box 10 is interposed between the exit end of the extrusion head 11 of a plastic material extrusion machine 12 and a lower fixed conduit section 14 of a continuous vulcanizing system. In the illustrative embodiment the head 11 of the splice box 10 and the fixed conduit section 14 are disposed at an angle of approximately 30° with respect to the horizontal. As is more fully set forth in the above-referred-to Ramsey and Van Riper application, an appreciable length of conduit section 14 below the splice box is straight, following which it is curved in the form of an elongated shallow half-catenary. Splice box 10 and the parts associated therewith are supported on a supporting means generally shown at 15 through the medium of means such as plates 18 welded to conduit section 14 in FIGS. 1 and 3.

Splice box 10 has an upper slidable conduit section 16 to the upper end of which is connected an extension sleeve or adaptor 17. The upper walls of conduit section 16 and sleeve 17 are aligned, section 16 having a diameter somewhat exceeding that of sleeve 17 so that the sheathed elongated material 31 may travel through the vulcanizing chamber without contacting any of the inner surfaces thereof. Conduit section 16 and sleeve 17 are sealed together by means of confronting flanges 19 and 20 on the upper and lower ends of such parts, respectively, such flanges being sealed by an interposed gasket and held together by a plurality of bolts 21 spaced therearound. A releasable joint 22 is provided between the upper end of sleeve 17 and the lower or exit end of the casing 24 of extrusion head 11. The construction of such slip joint is shown more fully in FIG. 2.

As there shown, head 11 is provided with a die holder 25 which is mounted in the casing 24 of the head, plastic material being forwarded under pressure by the extrusion machine 12 into the chamber in the head 11 through passage 27; the chamber in the head forms a part of a conduit system of which sleeve 17 and conduit sections 16 and 14 are parts. Such plastic material then flows outwardly through the die 26 and about an elongated core 29 which travels through the head so as to form a vulcanizable sheath 30 about the core 29 to produce the above-mentioned sheathed product 31.

The die holder 25 is provided with a sleeve-like extension 32 which is held centered in the exit end of housing 24 of the head by a centering sleeve 34. Sleeve 32 has an annular seat 35 in its outer end, such seat snugly receiving the forward end 36 of adaptor sleeve 17. End 36 of sleeve 17 is securely held in sealed relationship to head 11 by a sleeve 39 which functions as a nut, such sleeve having a flange 40 which snugly embraces sleeve 17. The forward end of sleeve 39 has threaded connection at 41 with the exit end of the head 11; and annular packing 44 is disposed between flange 40 of the nut and the annular outer portion 37 of sleeve 32. When nut 39 is tightened, the sleeve 17 is tightly held in sealed condition against withdrawal from head 11.

Mounted upon the upper or forward end of conduit section 14 is an upper fixed ring or flange 45, and mounted substantially rearwardly spaced therefrom is a second, generally similar fixed ring or flange 46. A welded joint 47 is provided between conduit section 14 and flange structure 45. Conduit section 14 is of somewhat greater diameter than the forward slidable section 16 so that section 16, when retracted, may lie telescoped within the forward end of section 14. Sealing between flange 45 and conduit section 16 is provided by a seal generally designated 49. Seal 49 includes an annular sealing member 50 disposed in a seat in the inner edge of flange 45 and having its inner surface sealingly contacting the outer surface of conduit section 16. Sealing member 50 is held thrust inwardly in conduit sealing condition by a presser ring 51 which surrounds the lower end of conduit section 16. Preferably, the annular sealing member 50 is made of a high temperature resistant fluorocarbon material having a low coefficient of friction; a typical suitable material is that known as "Teflon" (polytetrafluoroethylene).

Slidable conduit section 16 is thus guided at its lower end by the annular sealing member 50. Such member, which contacts conduit section 16 only around a relatively narrow annular band, maintains a sealing engagement with conduit section 16 in spite of appreciable misalignment between such conduit section and the flange member 45. The apparatus of the present invention provides means whereby the upper end of conduit 16 is permitted appreciable rocking movement about a horizontal diametral axis, to permit the conduit section 16 to bow, as above described, without imposing any undue stresses upon such conduit section or upon the guiding means now to be described.

The guiding means for conduit section 16 includes a pair of diametrically opposed parallel upper and lower guide rods 52 and 54, such guide rods being slidably mounted in journal bearing guides 55 mounted on radially oppositely projecting ears on flange 45 and by similar guides 56 mounted on ears 58 on the rear flange member 46. The rear ends of rods 52 and 54 rearwardly of guides 56 are secured to a slidable ring 57 by means of shoulders on the lower ends of the rods and nuts 59 on the threaded rear ends of the rods lying rearwardly of member 57. The member 57 is in the form of a ring having a central hole 60 therethrough of such size as to encircle and amply clear the straight conduit section 14 so as to be guided entirely by the parallel motion insuring guides 55 and 56 already mentioned.

The forward ends of rods 52 and 54 are connected by a relatively thick upper ring 61, the upper ends of the rods extending through openings in ring 61 and being secured thereto by nuts 62. The ring 61 has an inner diameter which is somewhat greater than the outer diameter of flanges 19 and 20 so as to provide an annular clearance space 64 between such members. Ring 61 is provided with diametrically opposed horizontal holes 66 which are threaded, as shown, each of such holes receiving a threaded pin 65. The cylindrical inner end 67 of each of pins 65 is of reduced diameter and is accurately received within a respective one of two shallow diametrally oppositely disposed holes 69 protruding inwardly from the outer surface of flange 19.

It will be seen that the conduit section 16 is thus held between the aforesaid sealing ring 50 at its lower end and the inner ends of the diametrically opposed aligned horizontal pins 65. Thus, even though the conduit section 16 is appreciably bowed in a vertical plane, it can readily be telescoped within conduit section 14, when the splice box is opened and withdrawn therefrom when the splice box is closed, since the sealing means 50 and the pins 65 permit the free movement of the ends of conduit section 16, as required. Such manner of mounting of conduit section 16 prevents damage to section 16, sealing means 50, and the mounting means for the upper end of section 16.

The fluorocarbon material, preferably polytetrafluoroethylene and the like, of which sealing ring 50 is made, is such as to preserve a seal between conduit section 16 and flange 45 despite substantial misalignment between the conduit section and the flange. Such material is tough, resilient, and swells somewhat when subjected to temperatures on the order of superheated steam, returning to its normal relaxed size when again cooled to atmospheric temperature. Thus when the splice box is closed, and the vulcanizing chamber subjected to steam pressure, the annular sealing means 50 soon establishes and maintains a complete seal between conduit section 16 and flange 45 even though the conduit section becomes substantially bowed, as above explained.

It is to be understood that the annular packing member 50 can be made of various known materials having suitable strength, high temperature resistance, wear resistance, etc. As indicated, the fluorocarbon materials are preferred. Among such materials which are suitable for use as annular sealing member 50, besides polytetrafluoroethylene, are "Teflon FEP," a copolymer of tetrafluoroethylene and hexafluoropropylene, CTFE resins (polychlorotrifluoroethylenes) such as those made and sold by Allied Chemical Corp. under the trademarks "Halon VK" and "Halon TVS," and homopolymers of CTFE resins such as that made and sold by Minnesota Mining and Manufacturing Company under the trademark "Kel-F."

Because the conduit section 16, adapter sleeve 17, guide rods 52 and 54, and the movable flanges and rings associated therewith are quite heavy, it is desirable that the described splice box be provided with power means both to open and close it. In the described embodiment, such means, shown more fully in FIGS. 3 and 4, are in the form of two double acting reciprocable fluid motors 71, the motors being disposed on opposite sides of the splice box on a diametral axial plane and with their lengths parallel to the rods 52 and 54. As shown, each of ears 58 of flange member 46 is provided with a transversely extending motor-supporting plate 70 to which the casing of the respective motor 71 is affixed. Each of the motors has a piston rod 72 which extends downwardly through and is connected to the ring member 57 by means such as nuts 74.

The motors 71 are provided with upper and lower conduits 75 and 76. When it is desired to open the splice box, fluid under pressure is directed from a source (not shown) into the upper conduit 75, fluid then being exhausted from the lower conduit 76. This causes the piston rod 72 to thrust connector ring 57 downwardly carrying with it guide rods 52 and 54 and thus the conduit section 16. When it is desired to close the splice box, fluid under pressure is introduced into conduit 76 and exhausted from conduit 75 thereby to reverse the motors 71 and to thrust conduit section 16 upwardly into the position shown in FIG. 1.

It is ordinarily desired that, for optimum performance of the splice box of the invention, that connection between the upper end of the movable conduit section and its guiding and moving means be made as close as possible to the upper end of such movable section and its adapter sleeve. In an alternative embodiment of the invention, shown somewhat fragmentarily in FIG. 5, parts which are generally similar to those in the first described embodiment are designated by the same reference characters but with an added prime. It will be seen that the apparatus of FIG. 5 is somewhat simpler than that of FIGS. 1-4, inclusive, in that the upper end of conduit section 16' and the adapter sleeve 17' are welded together along an annular weld 81. Adapter sleeve 17' includes an annular thickened portion 80 which thus combines to some extent the functions of flanges 19 and 20 in the first described embodiment. The ring 61', to which the upper ends of the guide rods (of which one is shown at 54') are attached, has two diametrically opposed pins 65' mounted therein, the inner ends 67' of such pins being rockingly disposed within radial seats 69' in thickened portion 80. An annular clearance space 64' is disposed between the inner surface of ring 61' and the outer surface of thickened portion 80, to permit the upper end of the movable conduit section to pivot freely within the limits required by the bowing of such conduit section during service. The embodiment of FIG. 5 permits the pivotal axis of pins 65' to be located as close as possible to the end of conduit section 16', 17', consistent with the provision of sufficient axial space along adapter sleeve 17' for the manipulation of the sleeve 39' which secures the adapter sleeve to the extrusion head (not shown in FIG. 5).

Although only a limited member of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

The invention is clearly defined in the appended claims. Where parts are, for clarity and convenience, referred to on the basis of their oriented position shown in the accompanying drawings, no limitation as to positioning of the entire structure is to be implied unless such limitation clearly appears in the claims. Also in both the description and the claims, parts may at times be identified by specific names for clarity and convenience, but such nomenclature is to be understood as having the broadest meaning consistent with the context and with the concept of the invention as distinguished from the pertinent prior art.

What is claimed is:

1. In a continuous vulcanizing system having an elongated chamber in the form of a conduit disposed at a substantial angle with respect to the vertical and adapted to be filled with high pressure steam and condensate, a splice box interposed in and forming a part of said chamber, said splice box comprising a conduit having a straight zone of substantial length, further conduit means at the forward end of the straight zone to which the forward end of such straight zone of the conduit may be selectively connected, releasable means for connecting and sealing the forward end of said straight zone of the conduit to the further conduit means, the section of the conduit at the forward end of the straight zone being separate from the remainder of the conduit at said straight zone, the end section of the said remainder of the conduit being fixed, the separate section of the conduit being selectively slidable forwardly along the axis of the straight zone into operative engagement with the further conduit means and retractable rearwardly along said axis substantially away from the further conduit means and into telescoped relationship with respect to the end section of the said remainder of the conduit at said straight zone, means sealing the separate conduit section to the remainder of the conduit at said straight zone, means positively guiding the forward end of the separate conduit section in a vertical axial plane parallel to the axis of said straight zone of the conduit, and pivot means connected to the last named means, said pivot means pivotally connecting the separate section of the conduit adjacent its forward end for limited turning about a substantially horizontal axis substantially normal to the said axial plane.

2. A splice box as claimed in claim 1, wherein the guiding means for the separate section of the conduit comprises guideways extending along opposite sides of the forward end of the said remainder of the conduit at said straight zone, said guideways lying in said vertical axial plane, elongated guide members slidable in said guideways, said guide members extending forwardly from said remainder of the conduit to overlie the separate conduit section throughout the greater part of the length of said separate conduit section, and means including said pivot means connecting the forward ends of the rod-like members to the said separate section of the conduit adjacent the forward end of such separate section.

3. A splice box as claimed in claim 2, wherein the means connecting the forward ends of the guide members to the separate section of the conduit comprises a ring-like member surrounding the separate section of the conduit, and wherein the pivot means comprises diametrically opposed pivot pins extending radially inwardly from the ring-like member and having their inner ends connected to the said separate section of the conduit.

4. A splice box as claimed in claim 3, comprising a second ring-like member surrounding the said remainder of the conduit rearwardly of the guideways, means connecting the guide members to the second ring-like member, and power means connected to the second ring-like member selectively to move such member and with it the elongated guide members and the separate conduit section in reverse directions to open and close the splice box.

5. A splice box as claimed in claim 2, wherein the sealing means is in the form of a sealing ring of yieldable material interposed between the remainder of the conduit at said straight zone adjacent the forward end of said remainder of the conduit, the sealing ring being fixed to one of the parts consisting of the separate conduit section and the remainder of the conduit at said straight zone and engaging the other of said parts along an axially narrow peripheral zone.

6. A conduit having a tendency in use to bowing in an axial plane, said conduit having a straight zone of substantial length disposed at a substantial angle with respect to the vertical, further conduit means at the forward end of the straight zone to which the forward end of such straight zone of the conduit may be selectively connected, releasable means for connecting and sealing the forward end of said straight zone of the conduit to the further conduit means, the section of the conduit at the forward end of the straight zone being separate from the remainder of the conduit at said straight zone, the end section of the said remainder of the conduit being fixed, the separate section of the conduit being selectively slidable forwardly along the axis of the straight zone into operative engagement with the further conduit means and retractable rearwardly along said axis substantially away from the further conduit means and into telescoped relationship with respect to the end section of the said remainder of the conduit at said straight zone, means sealing the separate conduit to the remainder of the conduit at said straight zone, means positively guiding the forward end of the separate conduit section in the axial plane parallel to the axis of said straight zone of the conduit coincident with the plane along which the conduit tends to bow, and pivot means connected to the last named means, said pivot means pivotally connecting the separate section of the conduit adjacent its forward end for limited turning about an axis normal to the said axial plane.

7. A conduit as claimed in claim 6, wherein the guiding means for the separate section of the conduit comprises guideways affixed with respect to and extending along opposite sides of the forward end of the said remainder of the conduit at said straight zone, said guideways lying in said axial plane, elongated guide members slidable in said guideways, said guide members extending forwardly from said remainder of the conduit to overlie the separate conduit section throughout the greater part of the length of said separate conduit section, and means including said pivot means connecting the forward ends of the rod-like members to the said separate section of the conduit adjacent the forward end of such separate section.

8. A conduit as claimed in claim 7, wherein the means connecting the forward ends of the guide members to the separate section of the conduit comprises a ring-like member surrounding the separate section of the conduit, and wherein the pivot means comprises diametrically opposed pivot pins extending radially inwardly from the ring-like member and having their inner ends connected to the said separate section of the conduit, and comprising a second ring-like member surrounding the said remainder of the conduit rearwardly of the guideways, means connecting the guide members to the second ring-like member, and power means connected to the second ring-like member selectively to move the separate conduit section in reverse directions to open and close the conduit.

References Cited in the file of this patent
UNITED STATES PATENTS

| | | |
|---|---|---|
| 853,974 | Hayden | May 21, 1907 |
| 2,737,685 | Fitler | Mar. 13, 1956 |